Patented May 10, 1949

2,469,472

UNITED STATES PATENT OFFICE 2,469,472

CATION EXCHANGE MATERIALS

Frederick C. Nachod, Haddonfield, N. J., and William Wood, Philadelphia, Pa., assignors to The Permutit Company, New York, N. Y., a corporation of Delaware No Drawing. Application March 15, 1944, Serial No. 526,650

1 Claim. (Cl. 260—79)

This invention relates to cation exchange and also to organic resinous cation exchange materials of synthetic origin, and to their manufacture.

Since the discovery of the principles of ion exchange and its application to the conditioning of water, the demand for improved exchange materials has accelerated. Whereas the ion exchange materials first used were inorganic and of natural origin, called zeolites, it was soon discovered that natural materials could, by processing, be made to produce improved results, not only by increase in exchange capacity, but more especially in life and durability when subjected to repeated cycles as in the treatment of water and regeneration of the exhausted exchange material.

One of the important uses of cation exchange materials has been in the conversion of dissolved calcium and magnesium salts in water to their corresponding sodium salts in order to remove so-called hardness. In cation exchange in the sodium cycle, the exchange material is a sodium salt containing sodium cations capable of exchanging with the calcium or magnesium cations in the water to be conditioned. The result of this exchange is to leave in the water sodium salts while the exchange material takes up the calcium and/or magnesium. This process is easily carried out in a filter bed which contains the exchange material and through which the water to be conditioned is percolated so as to come into intimate contact with the exchange material. When the exchange material becomes exhausted or substantially so, as indicated by the presence in water flowing out of the bed of traces of the salt which was to be converted, the practice is to backwash the bed to remove dirt and loosen it. The bed is then regenerated by treating the exchange material with a solution of an alkali metal salt, such as sodium chloride. After suitable rinsing, the regenerated bed is ready to soften a further quantity of hard water.

As the art developed, it became desirable in many uses of water that it be free from even the sodium salts which are not objectionable for other uses. It was finally discovered that water and aqueous solutions could be freed from all inorganic salts by using organic cation exchangers in the hydrogen cycle, in which the cation exchanger is regenerated with an acid to charge it with exchangeable hydrogen ions. The cation exchanger, in turn, exchanges these hydrogen ions for the metallic cations of salts in solution so that all salts may be converted to their corresponding acids. These acids may subsequently, if desired, be removed from the solution.

It has been recognized that organic cation exchange materials are capable of operating in either the sodium or hydrogen cycle. The severe conditions imposed upon the exchange material in repeated cycles where the material may be subjected first to acid and then to alkaline conditions make properties such as physical ruggedness, chemical stability, and insolubility or low color throwing of prime importance. In addition, of course, it is extremely desirable to combine such properties with a high operating capacity for cation exchange reactions.

The object of the present invention is to provide a synthetic organic resinous material having a high cation exchange capacity and substantially low color throwing properties, together with physical durability and long life. Basically, the present invention rests upon the discovery that certain resinous copolymers when properly constituted have the advantages set forth above to a high degree. It has been found that certain organic ring compounds having five members or their lower polymers, such as dimers and trimers, can be copolymerized with a material such as indene or coumarone to obtain products possessing great hardness and extreme durability when subjected alternatively to the action of dilute acid and dilute alkaline solutions. Examples of materials of this character containing a five-membered nucleus are cyclopentadiene, dicyclopentadiene and furfural. It has also been discovered that when materials having the five-membered nucleus, as indicated above, are combined with materials made up of a combination of a benzene ring and a five-membered ring, as in indene and coumarone, and the two materials are sulfonated and polymerized, there results, by a proper molar combination of the two, a product which has the advantages desirable in a synthetic resinous cation exchange material and substantial freedom from the disadvantages which have been characteristic of many materials heretofore known.

More specifically, therefore, the present invention is directed to a cation exchange material comprising a sulfonated copolymerization product embodying a combination of at least two cyclic aromatic organic compounds.

The sulfonation is preferably carried out by a reagent from the group comprising sulfuric acid, concentrated sulfuric acid, fuming sulfuric acid, sulfur trioxide gas, chlorosulfonic acid and the like. While the proportions of the ingredients to be polymerized may vary, it is preferred, for best results, that the indene or coumarone constituent be employed in a proportion of less than 1 mol. to each mol. of the other polymerizable constituent. Higher proportions of indene or coumarone have the advantage of increasing the exchange capacity of the product, but the disadvantage of increasing its solubility.

Since it has been found that the sulfonating agents can also be used to promote polymerization, it is possible to carry out the polymerization and the sulfonation simultaneously. It is preferred, however, because of better control of the reaction, to form the resin and then to sulfonate it. It is also possible to sulfonate the indene or coumarone constituent alone and then to carry out the copolymerization with the other constituents.

The duration of the reaction period ordinarily averages about two hours, but it may vary, depending upon the constituency of the resin, between the limits of one hour and ten hours or longer. When the sulfonation and polymerization are carried out simultaneously, the sulfonation-polymerization agent should be in excess of the other reactants preferably in the ratio of about three parts of the agent to one part of the reactants. When the material is subjected to the sulfonation after the polymerization reaction, it is desirable to use from about 0.85 to 4 or 5 parts by weight of concentrated sulfonating reagent for each part of the resin.

One satisfactory mode of preparing these products by simultaneous sulfonation-polymerization is to carry out the reaction at about 0° to 20° C. until a co-polymer is formed. This product may then be heated gradually to a temperature of 60° C. or higher until there results a hard granular product which may be broken up, washed, neutralized with sodium carbonate or bicarbonate, washed again, and then air dried. After being screened to the desired size, preferably about 10 to 50 mesh, the granular bodies may be regenerated with an acid or brine solution and used as either a hydrogen or sodium exchange material to treat water or aqueous solutions. Such a product has a very high exchange capacity, is very hard, has a high resistance to color throwing and shows substantially no capacity drop after passing through more than 400 cycles. In addition, this product has the important advantage of exhibiting approximately the same exchange capacity in both the sodium and the hydrogen cycles.

The following examples illustrate two different ways of preparing suitable cation exchange co-polymer resins. Obviously, however, the invention is not limited to these procedures but may be varied as will be apparent to those skilled in the art.

*Example 1.*—One mol of indene and one mol of dicyclopentadiene are mixed and 120 grams of 96% sulfuric acid are added. A rapid reaction takes place which results in the formation of a gel. The gel is broken up and dried at 80–100° C. The comminuted hard particles are treated with three times their weight of 20% fuming sulfuric acid and a hard granular cation exchange material was obtained. This material was tested for its ion exchange capacity, and it was found that it had a capacity of 1.75 m. eq. per gram, or 410 m. eq. per liter of exchange material, immaterial of whether the calcium ion in the solution was exchanged against hydrogen ions or sodium ions from the ion exchange material.

*Example 2.*—80 grams of fuming sulfuric acid were cooled in an ice bath to 10° C. and 25 grams of an equimolecular mixture of cyclopentadiene and indene were gradually introduced. Care was taken that the temperature did not rise above 20° C. After completed addition, the viscous black material was permitted to reach room temperature and then was heated to 60° C. for 2 to 3 hours, whereupon it became hard. The resulting solid mass was broken up and washed and then tested for ion exchange capacity. It was found that the product had a capacity of 2.3 m. eq. per gram, or 380 m. eq. per liter exchange capacity for both hydrogen and sodium ion exchange.

*Example 3.*—80 grams of fuming sulfuric acid were cooled in an ice bath to 10° C. and 25 grams of a mixture of furfural and indene in equimolecular ratio were added. The resulting ion exchange material had a capacity of 2 m. eq. per gram, or 400 m. eq. per liter for both sodium and hydrogen ion exchange.

Coumarone may be substituted for indene yielding similar products of similar physical and chemical characteristics.

While the precise chemical structure of the material is not known, tests made with combinations of cyclopentadiene, dicyclopentadiene, or furfural with indene or coumarone in various molar ratios indicate that the capacity of the material rises with increase in indene or coumarone content, apparently due to the sulfonation of the benzene ring of the indene or coumarone molecule. However, increase of the indene or coumarone content above about equimolecular proportions results in an increased color throwing due to increased solubility of the product in water. Hence, it is preferable for best overall results to maintain a molar ratio such that the quantity of the indene or coumarone constituent does not substantially exceed that of the other constitutent. Decrease in the indene or coumarone content, however, decreases the potential capacity of the product; hence, it is desirable to maintain the maximum indene or coumarone content consistent with satisfactory exchange capacity, color leaching and hardness. A product so constituted possesses high exchange capacity, substantially low color throwing properties and extremely long life. It has the advantage of resisting to a marked degree the action of dilute acid and dilute alkaline solutions when subjected to their action alternately, and exhibits satisfactory capacity in both the hydrogen and the sodium cycles.

The insolubility of the material is dependent to a considerable degree upon the size of co-polymer molecule obtained; that is the larger the molecule, the more insoluble the material becomes in water. Increase in the molecule size is promoted by the degree of polymerization to which the material is subjected during its manufacture as will be understood by those skilled in the art.

What we claim is:

A solid water insoluble organic cation exchange material comprising a sulfonated copolymer of indene with an equimolecular amount of cyclopentadiene.

FREDERICK C. NACHOD.
WILLIAM WOOD.

(References on following page)

REFERENCES CITED

The following references are of record in the file of this patent:

UNITED STATES PATENTS

| Number | Name | Date |
|---|---|---|
| 1,263,813 | Sperr et al. | Apr. 23, 1918 |
| 2,067,073 | Carmody | Jan. 5, 1937 |
| 2,198,378 | Ellis | Apr. 23, 1940 |
| 2,209,317 | Burroughs | July 30, 1940 |
| 2,226,134 | Liebknecht et al. | Dec. 24, 1940 |
| 2,235,971 | Wilson | Mar. 25, 1941 |
| 2,255,409 | Carmody | Sept. 9, 1941 |
| 2,340,110 | D'Alelio | Jan. 25, 1944 |

FOREIGN PATENTS

| Number | Country | Date |
|---|---|---|
| 117,016 | Great Britain | July 4, 1918 |
| 172,048 | Great Britain | Nov. 25, 1921 |
| 816,448 | France | May 3, 1937 |

OTHER REFERENCES

Snell, pp. 107, 111, 112, Ind. & Eng. Chem., Jan. 1943.

Groggins, pp. 208, 210 and 212, "Unit Processes in Organic Synthesis," 1st ed., pub. 1935 by McGraw-Hill, New York. (Copy in Div. 64.)